United States Patent [19]

Keller et al.

[11] 3,956,456

[45] May 11, 1976

[54] GYPSUM CALCINATION

[75] Inventors: Joseph A. Keller, Williamsville; Robert T. Spitz, Elma, both of N.Y.

[73] Assignee: National Gypsum Company, Buffalo, N.Y.

[22] Filed: Dec. 17, 1971

[21] Appl. No.: 209,242

[52] U.S. Cl. .............................. 423/171; 423/555; 106/109
[51] Int. Cl.² ........................................ C04B 11/02
[58] Field of Search ........... 423/554, 555, 171, 172; 23/122, 69; 106/109, 110

[56] References Cited
UNITED STATES PATENTS

| 1,746,294 | 2/1930 | Tyler | 423/172 |
| 2,485,317 | 10/1949 | Roetheli | 423/172 |
| 2,934,328 | 4/1960 | Zvejnieks | 423/171 |
| 3,579,300 | 5/1971 | Bloom et al. | 423/555 |

FOREIGN PATENTS OR APPLICATIONS

| 1,198,807 | 7/1970 | United Kingdom | 23/122 |
| 1,125,989 | 9/1968 | United Kingdom | 23/122 |

Primary Examiner—Oscar R. Vertiz
Assistant Examiner—Gregory A. Heller
Attorney, Agent, or Firm—Robert F. Hause

[57] ABSTRACT

The calcination of gypsum by continuously feeding fine gypsum spirally downwardly through a cylindrical zone into which heated air is injected almost tangentially forming a spiral air conveyor. The calcined gypsum collected at the bottom is of unusual uniformity and can be readily and controllably varied by controlled variations in the characteristics of the heated air conveyor.

8 Claims, 5 Drawing Figures

GYPSUM CALCINATION

The present invention relates to the calcination of gypsum by controlled suspension in a heated gas and more particularly to an improved method and apparatus for continuously calcining gypsum.

Calcination of gypsum, in its most common commercial form, involves heating gypsum, calcium sulfate dihydrate, and driving off some of the water of crystallization to form stucco, calcium sulfate hemihydrate. On subsequent addition of water to stucco, it will return to a rock-like calcium sulfate dihydrate. Although this basically is a very well known and ancient set of reactions, the stucco formed by calcination of gypsum can vary in its characteristics in many significant ways, depending on the method and apparatus employed. Several forms of heating devices have been used successfully to convert gypsum to stucco, such as large rotary kilns, kettles, and the multideck continuous calciner of Skinner et al, U.S. Pat. No. 2,788,960. Many other forms of heating devices have been tried resulting in producing very poor quality or useless calcined gypsum. Successful calcination normally requires the uniform removal of three-fourths of the combined water of substantially all of the gypsum being calcined. The presence of excess overburned or underburned material is one potential problem in calcining gypsum. Rehydration of the stucco with moisture formed by the calcination is another problem. Condensation followed by agglomeration of the solids on any elements of the calciner that are not kept suitably heated presents another problem.

It is an object of this invention to provide a novel method for producing a high quality calcined gypsum of unexpected characteristics and advantages.

It is a further object to provide a novel gypsum calciner for carrying out said method.

It is a still further object to provide a novel calcined gypsum, produced by said method.

These and other objects of the invention will be more readily apparent when considered in relation to the preferred embodiments of the invention as set forth in the specification and shown in the drawings in which.

Figure 1:
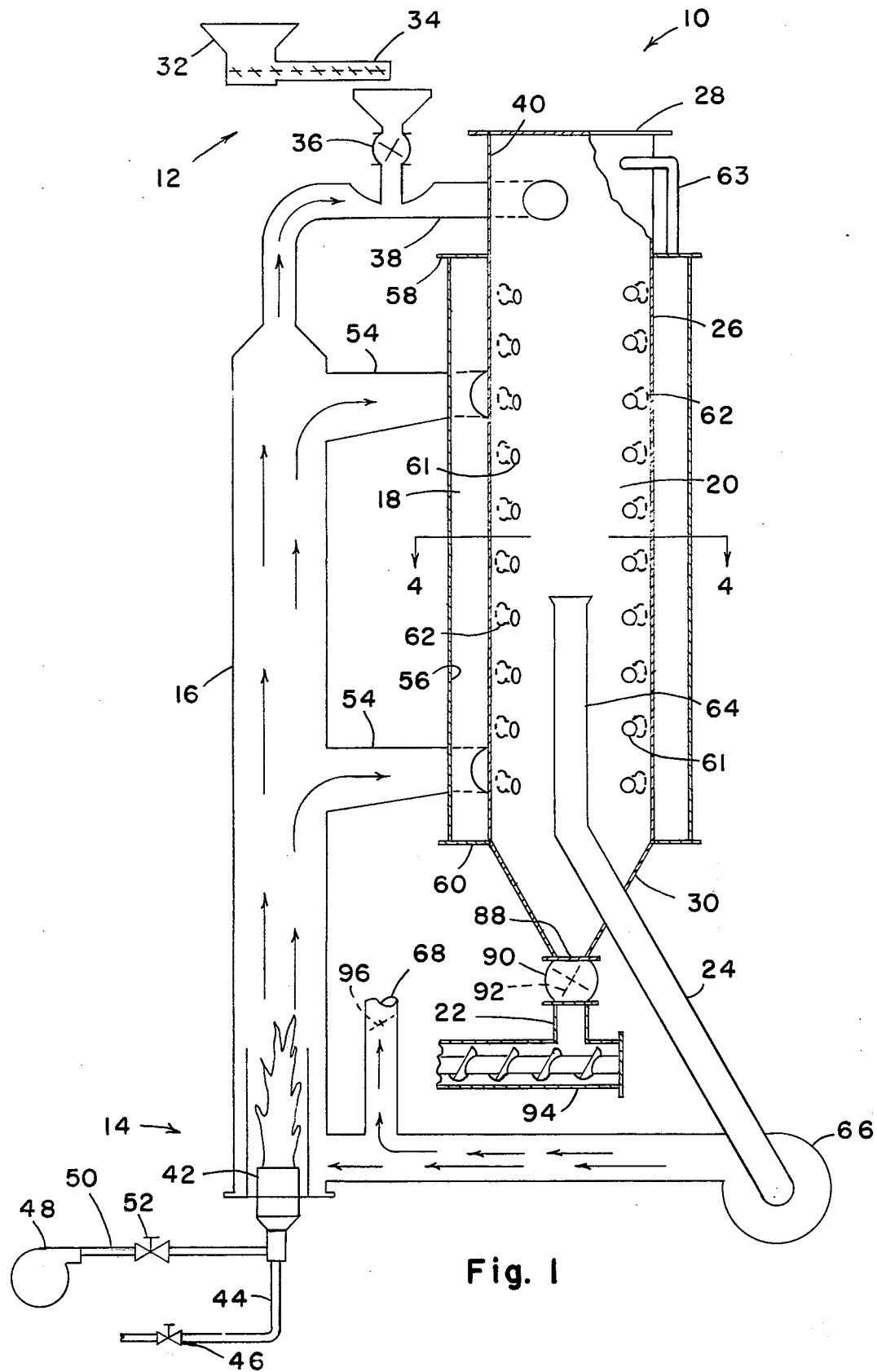
FIG. 1 is a diagrammatic view of apparatus for carrying out the method of the invention.

Referring to FIG. 1, there is shown diagrammatically a continuous flash calciner 10 for gypsum, including a gypsum feed section 12, a heat source 14, a hot gas plenum chamber 16, an inlet nozzle plenum 18, a calcining zone 20, a product outlet 22 and a wet gas outlet 24.

The main portion of the novel calciner is the calcining zone 20 which, in a preferred embodiment, is a nine and a half foot long standard carbon steel hollow calciner cylinder 26 of 16 inches inside diameter, with a covered top 28 and a frusto-conical hollow product discharge section 30 affixed to the bottom of cylinder 26.

Adjacent the top of cylinder 26 is the gypsum feed section 12. A finely ground gypsum powder, of about 90% through a 100 mesh screen, is supplied to a hopper 32 which provides a continuous supply to a controllably fixed speed screw feeder 34. Screw feeder 34 supplies a constant uniform supply of gypsum powder to a rotary valve 36 which provides a positive feed into a hot air inlet pipe 38 through which hot gas is constantly forced, into the top of the calciner cylinder 26. In the present embodiment, 5.9 tons per hour of gypsum are supplied to the calciner cylinder in order to produce 5 tons per hour of calcined gypsum.

The hot air inlet pipe 38 is one of several means by which hot air enters the calciner cylinder 26, all of which will be seen to be arranged to produce a high velocity clockwise rotary motion of hot gases and gypsum powder within the cylinder 26. Pipe 38 is adjoined to the wall of cylinder 26 so that the hot air and gypsum coming out of pipe 38 is moving substantially tangentially to the inner surface 40 of cylinder 26 as it enters cylinder 26.

The hot air used to heat the gypsum particles and convert them to calcium sulfate hemihydrate is heated directly by the flame of an oil fired burner 42, which is at the heat source 14 located at the bottom of the hot gas plenum chamber 16. This hot air is primarily recycled air which has already traveled through the calciner cylinder 26 and accordingly it will be understood that the term "hot air" is used loosely to mean the heated gases which include air, the products of combustion, and considerable vaporized water driven off the gypsum during the conversion to calcium sulfate hemihydrate as the air passed therethrough during previous cycles.

The heat source 14 further includes a fuel oil supply pipe 44 with suitable manual and automatic controls 46, and a combustion air blower 48 and air pipe 50 with suitable manual and automatic controls 52, both fuel pipe 44 and air pipe 50 providing constant fuel and air supplied to burner 42.

Recycled air is constantly fed through the flame of burner 42 producing heated gases of a temperature of over 400°F, preferably about 500°F to 700°F and in this example 600°F at a rate of 22,000 cubic feet per minute moving upward in the hot gas plenum chamber 16. This heated gas exits through either one of two side ducts 54 or the hot air inlet pipe 38 at the top. The hot air inlet pipe 38 provides a means of conveying the gypsum feed from below rotary valve 36 into the calciner cylinder 26, as discussed above.

The two ducts 54 conduct the hot air to the inlet nozzle plenum 18 which completely surrounds most of the full length of the calciner cylinder 26. The inlet nozzle plenum 18 is an 8 foot long standard carbon steel hollow cylinder of 32 inches outside diameter, concentrically surrounding the lower eight feet of the nine and a half foot long calciner cylinder 26. The ducts 54 are adjoined to the wall of the inlet nozzle plenum 18, one near the top and one near the bottom, so that the hot air coming out of the ducts is moving substantially tangentially to the inner surface 56 of plenum 18 as it enters plenum 18, producing a clockwise rotary motion of hot air in the space between inner surface 56 and the cylinder 26. The inlet nozzle plenum 18 is closed by a top cover 58 and a bottom cover 60.

All of the hot air entering the inlet nozzle plenum 18 through ducts 54 proceeds to flow therefrom into the calciner cylinder 26 through a plurality of calciner cylinder wall holes 61 with associated nozzles 62 mounted on the wall of the calciner cylinder, or through a top inlet pipe 63. Each nozzle 62 is mounted so that the hot air coming out of the nozzle is moving substantially tangentially to the inner surface 40 of the calciner cylinder as it goes through hole 61 which, in cooperation with the hot air coming in through pipes 38 and 63, produces a clockwise rotary motion of hot air and of the gypsum particles in the calciner cylinder 26.

Figure 4:
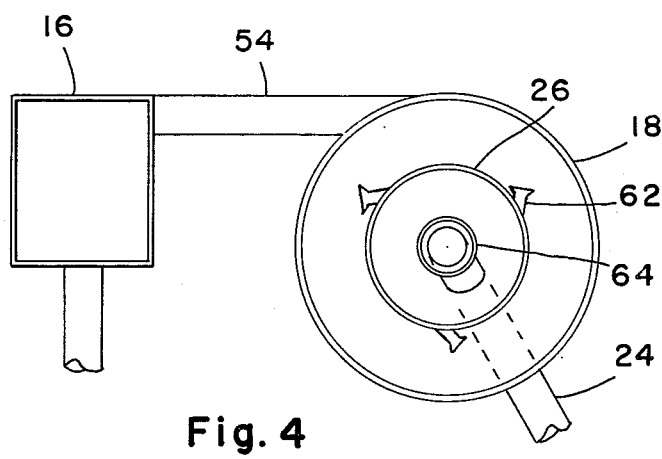
FIG. 4 is a cross sectional plan view taken along line 4—4 of FIG. 1.

The nozzles 62 may be adjustably mounted to permit individual adjustment of each nozzle axis from about 30° downward from horizontal to about 30° upward from horizontal, normally from about 1° downward to about 15° downward from horizontal, and in the embodiment shown they are fixed at about 10° downward, whereby the gypsum particles being carried in a rotary motion will progress slowly from the top to the bottom of the calcining zone 20. The nozzles are mounted uniformly about the circumference and along the height of the calciner cylinder 26, with, for example, two vertical rows of ten nozzles 62 being shown on the back half of the calciner cylinder seen in FIG. 1, it being understood that a third row is disposed opposite the two rows shown in the front half, FIG. 4. As another example, two vertical rows of fifteen nozzles each might be employed with the two rows disposed diametrically opposite each other, and the nozzles each angled downwardly at an angle of about 5° to 10° with the horizontal. The nozzles consist essentially of a hollow flared tube mounted externally on the calciner cylinder wall for guiding the hot air substantially tangentially through holes 61 in the calciner cylinder wall. The hot air adjacent the inner surface 40 thus progresses downwardly slowly, relative to its rotary speed, forcing, by centrifugal action, the calcining gypsum outwardly into the downwardly spiraling hot air. Meanwhile, air that is further from the inner surface 40, and contains very little gypsum, moves toward a gas outlet 24 disposed on the central vertical axis of the calciner cylinder.

The gas outlet 24 consists of an upwardly opening vertical outlet pipe 64, which extends about one-third of the way up from the bottom toward the top of calciner cylinder 26. This pipe could terminate elsewhere along the central axis or it could have a plurality of openings along its length. Pipe 64 extends coaxially part way down into product discharge section 30 and then is bent to extend out through the wall of product discharge section 30. Outlet pipe 64 terminates at a primary air fan 66, which pulls air out of the center of the calciner cylinder 26 and forces air, most of which proceeds through the flame of burner 42 and into the hot gas plenum chamber 16, as described above.

The primary air fan 66 moves approximately 18,500 cubic feet of air per minute, which air is still at about 380°F. About 2,000 cubic feet per minute of this air is directed out of the system through exhaust outlet 68. This exhaust gas contains a very small amount of calcined gypsum dust. The high temperature of this gas makes it potentially useful in any other adjacent processes which might benefit from this available heat.

Figure 2:
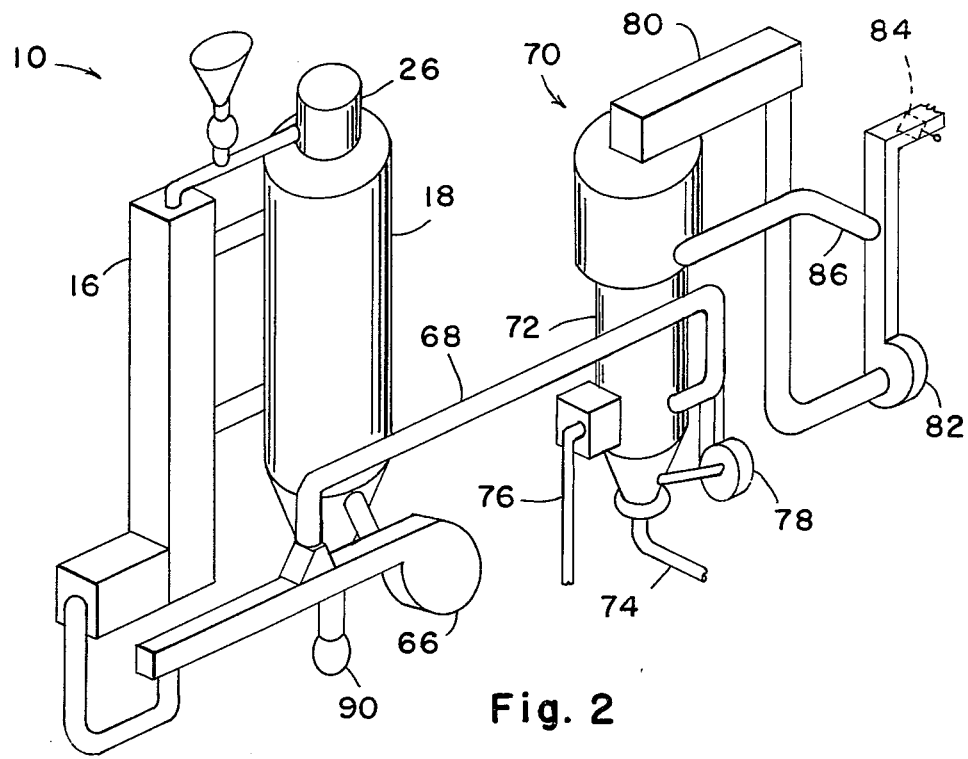
FIG. 2 is a perspective view of the apparatus of FIG. 1 with a wet air collector.
Figure 3:
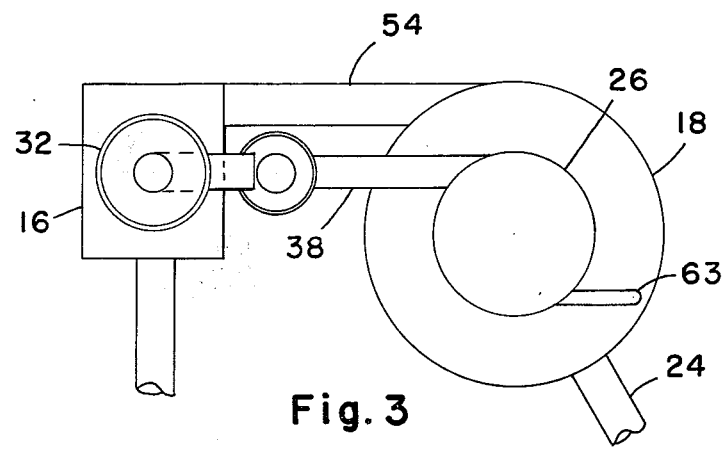
FIG. 3 is a plan view of the apparatus of FIG. 1.

FIG. 2 is a perspective view of the calciner 10 and to the right thereof a wet air collector 70. Exhaust outlet 68 carries the very wet hot air from the calciner 10 to the wet collector chamber 72. The moisture is condensed and combines with the gypsum dust and is removed through a slurry outlet 74. A make-up water inlet 76 supplied cool water to assist in this process. A recirculation pump 78 initiates the cooling and condensing of the incoming hot material. Air is removed through top outlet 80 and proceeds to an air circulating fan 82, directing the air to any other use or to the atmosphere through a damper 84. A portion of the air from fan 82 is recirculated back through chamber 72 through secondary air inlet 86, the amount being dependent on the setting of damper 84.

This method of disposal of the exhaust gas is described by way of example and is not critical to the calcination process in calciner 10.

Considering further the calciner 10, the product outlet 22 will be seen to be located at the very bottom of the frustoconical product discharge section 30. As the calcining gypsum moves downward through the calcining cylinder 26 it is centrifugally forced away from the central axis by the rapidly spiralling hot air. As the gypsum moves downward through the discharge section 30, the frusto-conical shape directs the calcined gypsum inwardly to a central axial opening 88, and thence to a rotary valve 90. Rotary valve 90 has rotating blades 92 positively driving the exiting calcined gypsum downward to the inlet of a screw conveyor 94, which continuously conveys the calcined gypsum to any suitable storage bin, cooler, or product bagger, not shown.

As discussed above, the heated air in the hot gas plenum chamber 16 is at a temperature of about 600°F and after passing through the nozzle plenum 18 and the calcining zone 20, it exits through the gas outlet 24 at about 380°F. A substantial portion of this heat is transferred to the fine gypsum powder being fed through the gypsum feed section 12 starting at ambient temperature, the calcining zone 20 and exiting through the product outlet at about 360°F, and which has been converted from gypsum, ($CaSO_4.2H_2O$) to calcined gypsum or stucco ($CaSO_4.½H_2O$), with substantial quantities of water vapor added to the circulating hot air.

As the calcination of gypsum process is started in calciner 10, the heated air being circulated has little more moisture in it than the ambient air conditions, however as this air is recycled the moisture content rapidly increases and will very quickly reach an equilibrium level of approximately 50% by weight water vapor. This high moisture content in the atmosphere surrounding the fine gypsum particles which are being heated thereby to a temperature whereat they lose some of their chemically attached water is believed to be a factor in causing the calcined gypsum of this process to have some completely unexpected and advantageous characteristics.

Figure 5:
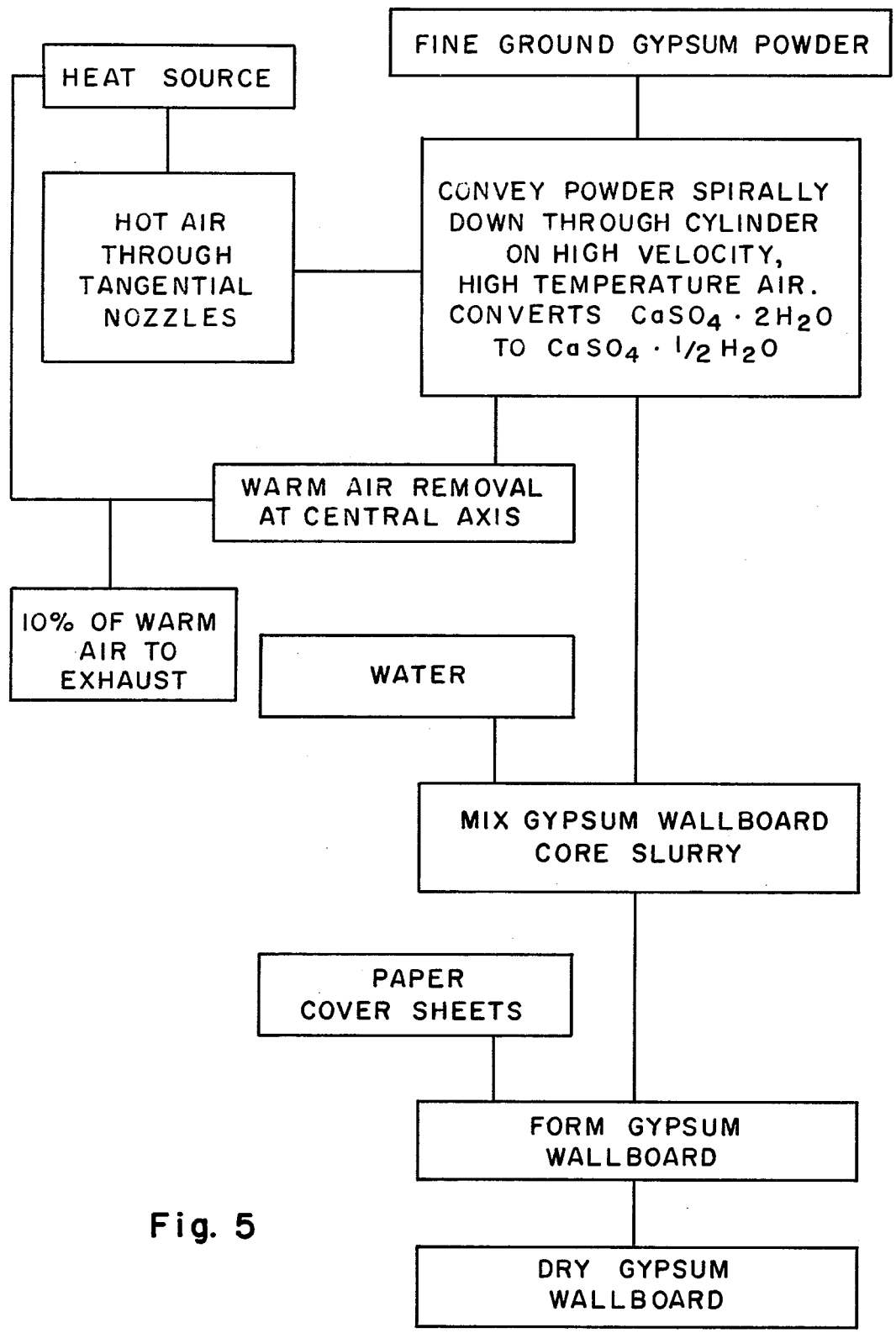
FIG. 5 is a flow diagram of the preferred form of process of the present invention.

A preferred use of the novel calcined gypsum produced by the process described above is in forming the gypsum core of paper covered gypsum wallboard. The flow diagram of FIG. 5 shows the several steps through the process of converting gypsum to calcined gypsum by driving off water of hydration, adding water to the calcined gypsum forming a slurry, and forming the slurry into board form, with paper cover sheets, and drying the resultant board thus formed.

The manipulative steps in forming the slurry and paper cover sheets into wallboard are generally similar to those used in prior wallboard manufacturing processes. The differences in the process were unexpectedly found in the markedly lower starch additive required in the core slurry to obtain satisfactory bond between the gypsum core and the paper cover sheets compared to prior practice, and in the faster and consistently uniform setting times and thus the markedly lower set accelerator additive required in the core slurry to obtain sufficiently rapid hardening of the core to a handleable condition.

A still further unexpected advantage in the use of the novel calcined plaster in gypsum board is the ability to use this material in an overburned condition with markedly less disadvantages compared to equally overburned material produced in prior calcination processes. For example, gypsum having a purity of 88.8% would have 18.59% water of hydration, and if perfectly calcined to calcium sulfate nemihydrate it would have a theoretical water content of 5.4%. If the calcination of this gypsum were carried on for a time and with a temperature which resulted in a product having substantially above 5.4% combined water, this product would perform as though a substantial portion of the product were uncalcined gypsum, which accelerates the set and reduces the set product integrity and strength. If the calcination of this gypsum is carried on for a time and at a temperature which results in a product having substantially below 5.4% combined water, the product will tend toward having the properties of dead burnt gypsum being very slow to rehydrate and set, after water is added. Unexpectedly such an overburned product of the present novel calcination process has nowhere near as bad effects as overburned products of prior calcination processes. Thus the process can be controlled to produce a product with some degree of overburn, to avoid the disadvantages of an underburned product without the usual disadvantages of an overburned product. Along this same technical point it should be further noted that, whereas prior commercial calcination processes involved a relatively lengthy time period for any given particle of gypsum, the novel method of calcination herein involves only a matter of seconds from the time a given particle of gypsum enters the calciner 10 until it exits, whereby very close and instantaneous adjustments of hot air temperatures and velocities can be made to result in almost instantaneous effects on the product being produced. These hot air temperatures and velocities will be seen to be very widely variable over an almost limitless range.

The calciner 10 should include several safety and quality control devices which were not includes in the above description. Temperature measuring thermostats T are shown in the gas plenum chamber 16, the inlet nozzle plenum 18, the product outlet 22, the wet gas outlet 24 and the exhaust outlet 68. An exhaust damper 96 in exhaust outlet 68 controls the rate of air exhausted therethrough. The total rate of air flow through primary air fan 66 is also subject to a wide variation by usual control devices.

FIG. 5 will be seen to provide a readily understood flow diagram, summarizing the process of the invention, as described hereinabove.

Having completed a detailed disclosure of the preferred embodiments of our invention, so that others may practice the same, we contemplate that variations may be made without departing from the essence of the invention.

We claim:

1. The method of continuously converting calcium sulfate dihydrate to settable cementitious calcium sulfate hemi-hydrate comprising the steps of continuously feeding finely ground gypsum to a peripherally confined cylindrical heating zone, conveying said gypsum through said heating zone by means of heated gases moving, with a rotary motion, therethrough, said heated gases being introduced into said heating zone in paths substantially tangential to and adjacent to the cylindrical periphery of said heating zones at a velocity sufficient to propel said ground gypsum spirally through the length of said cylindrical heating zone, and heating said gypsum with said heated gases to a temperature sufficient to drive off a portion of the chemically combined water therein, said heating of said gypsum forming calcium sulfate hemi-hydrate.

2. The method of claim 1 wherein said heated gases are removed from said heating zone through an outlet pipe having an opening at substantially the central axis of said heating zone.

3. The method of claim 2 wherein a major portion of said removed heated gases are reheated and reused in further conversion of calcium sulfate dihydrate to calcium sulfate hemi-hydrate in said cylindrical heating zone.

4. The method of claim 3 wherein about 90% of said heated gases are reheated and recycled.

5. The method of claim 1 wherein said finely ground gypsum has a fineness such that approximately 90% will pass through a 100 mesh screen.

6. The method of claim 1 wherein said cylindrical heating zone is formed with a plurality of holes uniformly distributed therethroughout, and wherein said heated gases are guided through said holes in a direction substantially tangential to the periphery of said heating zone and between about 1° and 15° out of a plane perpendicular to the axis of said heating zone.

7. The method of claim 1 wherein said heated gases are at a temperature of at least about 380°F and substantially ambient air pressure and wherein said calcium sulfate hemi-hydrate formed therein is removed therefrom at a temperature of about 360°F.

8. The method of claim 7 wherein said heated gases are removed from said heating zone through an outlet located on the central axis of said heating zone and about 90% of the gases removed are reheated and recycled, and wherein said finely ground gypsum has a fineness such that about 90% will pass through a 100 mesh screen.

* * * * *